United States Patent
Strobel et al.

(10) Patent No.: US 11,428,821 B2
(45) Date of Patent: Aug. 30, 2022

(54) METHOD FOR MONITORING AN INTEGRITY OF REFERENCE STATIONS OF A CORRECTION SERVICE SYSTEM, CORRECTION SERVICE SYSTEM, METHOD FOR OPERATING A SATELLITE-ASSISTED NAVIGATION SYSTEM AND SATELLITE-ASSISTED NAVIGATION SYSTEM

(71) Applicant: Robert Bosch GmbH, Stuttgart (DE)

(72) Inventors: Jens Strobel, Freiberg am Neckar (DE); Markus Langer, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 16/604,198

(22) PCT Filed: Mar. 1, 2018

(86) PCT No.: PCT/EP2018/055125
§ 371 (c)(1),
(2) Date: Oct. 10, 2019

(87) PCT Pub. No.: WO2018/188848
PCT Pub. Date: Oct. 18, 2018

(65) Prior Publication Data
US 2020/0064489 A1 Feb. 27, 2020

(30) Foreign Application Priority Data
Apr. 12, 2017 (DE) .......................... 102017206280.0

(51) Int. Cl.
G01S 19/20 (2010.01)
G01S 19/41 (2010.01)
G01S 19/07 (2010.01)

(52) U.S. Cl.
CPC ............ *G01S 19/20* (2013.01); *G01S 19/074* (2019.08); *G01S 19/41* (2013.01)

(58) Field of Classification Search
CPC ........... G01S 19/20; G01S 19/74; G01S 19/41
(Continued)

(56) References Cited

U.S. PATENT DOCUMENTS 6,138,074 A 10/2000 Gower et al.
2012/0299770 A1* 11/2012 Lee .......................... G01S 19/20
342/357.67
(Continued)

OTHER PUBLICATIONS

International Search Report for PCT/EP2018/055125, dated Jun. 7, 2018.

*Primary Examiner* — Bo Fan
(74) *Attorney, Agent, or Firm* — Norton Rose Fulbright US LLP; Gerard Messina (57) ABSTRACT

A method for monitoring an integrity of reference stations, having known and fixed coordinates, of a correction service system for a satellite-supported navigation system. A first group of the reference stations is operated to receive satellite signals of a plurality of satellites of the satellite-supported navigation system. It is provided that a) a first reference station is selected from the first group, and b) at least one first correction value is ascertained as a function of the satellite signals respectively received by the remaining reference stations of the first group, and c) the monitoring of the integrity is carried out in that first coordinates of the first reference station, determined using the satellite signals received by the first reference station and using the at least one first correction value, are compared with the known coordinates of the first reference station and checked for at least one first deviation.

14 Claims, 2 Drawing Sheets

(58) Field of Classification Search
USPC .......................... 342/357.44, 357.24, 357.67
See application file for complete search history.

(56) References Cited

U.S. PATENT DOCUMENTS

| | | |
|---|---|---|
| 2014/0035778 A1 | 2/2014 | Hautiere et al. |
| 2015/0362596 A1* | 12/2015 | Nozaki .................. G01S 19/07 342/357.44 |
| 2016/0116595 A1 | 4/2016 | Scheitlin et al. |

* cited by examiner

Fig. 1

METHOD FOR MONITORING AN INTEGRITY OF REFERENCE STATIONS OF A CORRECTION SERVICE SYSTEM, CORRECTION SERVICE SYSTEM, METHOD FOR OPERATING A SATELLITE-ASSISTED NAVIGATION SYSTEM AND SATELLITE-ASSISTED NAVIGATION SYSTEM

FIELD

The present invention relates to a method for monitoring an integrity of reference stations of a correction service system, and to a correction service system. In addition, the present invention relates to a method for operating a satellite-supported navigation system, and to a satellite-supported navigation system.

BACKGROUND INFORMATION

Global navigation satellite systems (GNSS) enable a determination of a position of user devices, for example navigation systems, in a coordinate system. Using such a user device, runtimes of received satellite signals from satellites of the global navigation satellite system are ascertained, and from this paths between the respective satellites and the user device are derived. The speed of light is standardly taken as the transmission speed of the satellite signals. If disturbances occur during transmission, due for example to conditions in the ionosphere or the troposphere, then, inter alia, changes in runtime may occur, which can cause errors in the determination of position. In order to take such disturbances into account, correction services use an existing network of stationary reference stations to ascertain correction values as a function of the respectively received satellite signals and known coordinates of the respective reference station, and supply these correction values to the user devices. Using the correction values, errors of the type described in the determination of the position of the user devices can be corrected. An integrity of a reference station, in the sense of correct functioning thereof in connection with such correction services, is not present for example if error-free operation thereof, for example a reception of satellite signals, is not possible due to constructive changes in the environment surrounding this reference station, a manipulation thereof, or other defects in the reference station, and such a lack of integrity can result in the provision of incorrect correction values. Uncertainty regarding the integrity of reference stations is critical in particular in safety-relevant applications. An efficient and effective identification of an individual reference station that lacks integrity within a network of a plurality of reference stations is made more difficult due to the fact that no observation variables that are independent of the individual reference station, and in particular are unfalsified, such as satellite signals, correction values, or other data, are present on the basis of which the integrity of the individual reference station could be checked. Monitoring of the integrity of reference stations in a network of a plurality of reference stations is therefore extremely time-consuming and cost-intensive.

SUMMARY

An object of the present invention is to provide a method for monitoring the integrity of reference stations of a correction service system, as well as a correction service system, a method for operating a satellite-supported navigation system, and a satellite-supported navigation system, in which the named disadvantages do not occur.

This object is may be achieved through the provision of the present invention. Advantageous embodiments are described herein.

The object may be achieved in particular by providing a method for monitoring the integrity of reference stations, having known and fixed coordinates, of a correction service system for a satellite-supported navigation system in a coordinate system, at least one first group of the reference stations being operated so as to receive satellite signals of a plurality of satellites of the satellite-supported navigation system. In the context of the method, in a step a) a first reference station is selected from the first group. In a step b), at least one first correction value is ascertained as a function of the satellite signals respectively received by the remaining reference stations of the first group and of the known coordinates of the respective remaining reference stations of the first group. For example, the remaining reference stations of the first group are checked for a deviation between coordinates respectively determined using the received satellite signals and the known coordinates of the respective reference station, the at least one first correction value being ascertained as a function of an acquired deviation. In a step c), the monitoring of the integrity is carried out in that first coordinates of the first reference station, which are determined using the satellite signals received by the first reference station and the at least one first correction value, are compared with the known coordinates of the first reference station and are checked for at least one first deviation. The method has advantages in comparison with the existing art. Due to the fact that the first correction value is determined independently of data that are provided, or at least influenced, by the first reference station, the integrity of the first reference station can be effectively checked by checking for the at least one first deviation. In particular, using the method a reference station having a lack of integrity in a network of a plurality reference stations is identified quickly and easily, thus ensuring a high degree of precision of a determination of position by user devices in the satellite-supported navigation system. Preferably, it is checked whether, given the presence of a first deviation of the type described, each of the remaining reference stations of the first group has a critical mismatch between coordinates ascertained using satellite signals received by the remaining reference stations of the first group, and using the at least one correction value, and the known coordinates of the respective remaining reference station of the first group. If no critical mismatch is present in particular in the remaining reference stations of the first group, then the at least one first correction value can be regarded as correct, and a lack of integrity of the first reference station can then be inferred. If a critical mismatch is present in the remaining reference stations of the first group, then the at least one first correction value can be regarded as incorrect. In this case, a lack of integrity of the first reference station cannot be immediately inferred. In particular, a first deviation is not present when the first coordinates of the first reference station do not deviate, or deviate only slightly, from the known coordinates of the first reference station. This can in particular indicate the presence of a correct at least one first correction value, and a correct functioning of the remaining reference stations of the first group can be deduced from this. In particular, this can also indicate an integrity of the first reference station. Preferably, the reference stations are fashioned as stationary, in particular local reference stations.

Particularly preferably, the correction service system has a global network having a multiplicity of reference stations. Preferably, it is provided that the reference stations can be combined at least to form a first group of the type indicated, the first group preferably including at least two, preferably more than two, reference stations. "The remaining reference stations of the first group," which remain after the selection of the first reference station from the first group, is understood as referring to the reference stations of the first group without the first reference station. Preferably, the steps a), b), and c) are carried out sequentially, step b) immediately following step a), and step c) immediately following step b). In another preferred specific embodiment of the method, it is preferred that steps b) and c) overlap at least partially.

In a preferred specific embodiment of the method, in a step d) second coordinates of the first reference station, which are determined only using the satellite signals received by the first reference station, are compared with the known coordinates of the first reference station and are checked for at least one second deviation. In the determination of the second coordinates of the first reference station, the at least one first correction value is not taken into account; rather, only the satellite signals received by the first reference station are evaluated in combination with the known coordinates of the first reference station. Particularly preferably, step d) is carried out parallel to step b) and/or to step c). However, it is also possible for step d) to be carried out immediately after step c), or in some other appropriate temporal configuration. Thus, a further check of the first reference station for a lack of integrity is advantageously carried out by checking the second coordinates for the at least one second deviation. No second deviation is present in particular when the second coordinates of the first reference station do not deviate, or deviate only slightly, from the known coordinates of the first reference station. In particular, given the presence of such a second deviation, a lack of integrity of the first reference station can be inferred. In this way, the precision and speed of the method are increased.

In addition, it is preferably provided that a second group of reference stations, different from the first group, is operated so as to receive satellite signals from the plurality of satellites, at least one second correction value being ascertained, in a step e), as a function of the satellite signals respectively received by the reference stations of the second group and the known coordinates of the respective reference station. For example, the reference stations of the second group are checked for a deviation between coordinates respectively determined using the received satellite signals and the known coordinates of the respective reference station, the at least one second correction value being ascertained as a function of an acquired deviation. Third coordinates of the first reference station, determined using the satellite signals received from the first reference station and from the at least one second correction value, are then preferably compared with the known coordinates of the first reference station and are checked for at least one third deviation. Preferably, it is checked whether, given the presence of a third deviation of the type described, the remaining reference stations of the first group each show a critical mismatch between coordinates ascertained using satellite signals received by the remaining reference stations of the first group and using the at least one second correction value and the known coordinates of the respective remaining reference stations of the first group. If a critical mismatch is not present in particular in the remaining reference stations of the first group, then the at least one second correction value can be regarded as correct, and a lack of integrity of the first reference station can be inferred. If a critical mismatch is present in the remaining reference stations of the first route, then the at least one second correction value can be regarded as incorrect. In this case, a lack of integrity of the first reference station cannot be immediately inferred. A third deviation is not present in particular when the third coordinates of the first reference station do not deviate, or deviate only slightly, from the known coordinates of the first reference station. This can indicate in particular a correct at least one second correction value, and here a correct functioning of the reference stations of the second group can be deduced. In particular, this can also indicate an integrity of the first reference station. Here, it is possible that the first and second group of reference stations overlap; particularly preferably the first and second group of reference stations do not overlap. Particularly preferably, step e) is carried out in parallel with step b) and/or with step c) and/or with step d). However, it is also possible for step e) to be carried out immediately after step c) or step d), or in some other appropriate temporal configuration. In this way, a further checking of the first reference station for a lack of integrity is advantageously carried out by checking the third coordinates for the at least one third deviation. In this way, the precision and speed of the method according to the present invention are further increased.

Preferably, in a step f) a second reference station, different from the first reference station, is selected from the first group. Subsequently, if no critical first and/or second and/or third deviation is ascertained, steps b) and c), and preferably steps d) and/or e), are preferably carried out for the second reference station. That is, the first reference station preferably continues to be taken into account in the carrying out of steps b), c), and preferably d) and/or e) for the second reference station. A critical first and/or second and/or third deviation is not present in particular when either no, or hardly any, first and/or second and/or third deviation is present, or such a deviation is present but a critical mismatch is then also present in the remaining reference stations of the first group. To this extent, such a deviation is critical if it indicates a lack of integrity of the first reference station. A "critical deviation" is thus to be understood in particular as a deviation that results, with an increased probability, in the provision of incorrect correction values by the first reference station. Preferably, step f) immediately follows step c) and/or step d) and/or step e). In this way, a systematic and fast checking of the reference stations of the first group for a lack of integrity is enabled.

Alternatively, it is preferably provided that in a step f') the second reference station is selected from the first group, and that, given the ascertaining of a critical first and/or second and/or third deviation, the steps b) and c), as well as preferably d) and/or e), are carried out for the second reference station, instead of the first reference station, without taking the first reference station into account. A critical first and/or second and/or third deviation is present in particular when, in addition to the first and/or second and/or third deviation, a critical mismatch is present at the remaining reference stations of the first group. To this extent, such a critical deviation indicates a lack of integrity of the first reference station. Preferably, in step b), the at least one first correction value is ascertained as a function of the satellite signals respectively received by the remaining reference stations of the first group—excluding the first reference station—and the known coordinates of the respective remaining reference station of the first group—excluding the first reference station. Preferably, in step c) the monitoring of the integrity is carried out in that the first coordinates of the second reference station, which are determined using the satellite signals received by the second reference station and using the at least one first correction value—excluding the first reference station—are compared with the known coordinates of the second reference station and are checked for the at least one first deviation. Preferably, in step d) the second coordinates of the second reference station, which are determined only using the satellite signals received by the second reference station, are compared with the known coordinates of the second reference station, and are checked for the at least one second deviation. Preferably, in step e) the third coordinates of the second reference station, which are determined using the satellite signals received by the second reference station and using the at least one second correction value, are compared with the known coordinates of the second reference station and are checked for the at least one third deviation. Particularly preferably, step f) follows step e) immediately. Preferably, step f) follows step c) and/or step d) and/or step e) immediately. In this way, it is in particular possible to exclude a reference station having a lack of integrity in particular from the first group of reference stations, such that a provision of errored correction values can be easily and reliably prevented. In particular, a reference station having a lack of integrity can be excluded until the integrity thereof is restored, for example by a repair operation.

According to a further preferred specific embodiment of the method, discrepancies relating to the satellite signals received by the first and/or by the second reference station, and/or of the at least one first and/or second correction value, are ascertained taking into account an acquired critical first and/or second and/or third deviation. Discrepancies of this type relate in particular to incorrectness, incompleteness, or absence of the satellite signals received by the first and/or by the second reference station and/or of the at least one first and/or second correction value. In this way, the cause of a lack of integrity of the first and/or second reference station can be effectively ascertained.

It is preferably provided that steps a), b), and c), as well as preferably d) and/or e) and/or f) and/or f'), are carried out for all reference stations of the first group. In this way, a plausibility check is preferably carried out of various correction values or of data relevant for a derivation of correction values, which data are specified or produced respectively by various reference stations in particular of the first and/or of the second group. In this way, the first group of reference stations can be checked for a lack of integrity effectively and efficiently, one or more reference stations having a lack of integrity preferably being excluded from the first group.

In addition, it is preferably provided that the first and/or the second and/or the third coordinates of the first and/or of the second reference station are determined using a first and a second coordinate ascertaining method. Here, the first and the second coordinate ascertaining methods are preferably different from one another. Particularly preferably, the first coordinate ascertaining method is designed as a method for instantaneous ascertaining of coordinates, preferably as a non-recursive method. This method has in particular a shorter convergence time, realizing a particularly short time until an error recognition. Preferably, the second coordinate ascertaining method is designed as a coordinate ascertaining method having a convergence time that is longer in comparison with the first coordinate ascertaining method, in particular realizing a particularly high precision of the ascertaining of coordinates. Due to the fact that the first and the second coordinate ascertaining methods are carried out during the method according to the present invention, it is in particular possible to quickly recognize slowly developing errors, and at the same time to ensure a low false alarm rate as well as a high degree of precision of the determination of position in the satellite-supported navigation system. In particular, through a calibration of the first and second coordinate ascertaining method, an optimization of the method according to the present invention can be ensured, in particular with regard to a high speed of error recognition and a high degree of precision, in particular an effective avoidance of false alarms.

It is preferably provided that the first and the second coordinate ascertaining methods are carried out parallel to one another. Preferably, the first and the second coordinate ascertaining methods are carried out temporally parallel to one another. Preferably, the first and the second coordinate ascertaining methods are carried out in parallel at least in parts, and particularly preferably in their entirety. In this way, in particular a rapid and reliable recognition of a lack of integrity of reference stations is ensured.

Preferably, in the first and/or second coordinate ascertaining method, after a determination of the first and/or the second and/or the third coordinates of the first and/or of the second reference station has been carried out, at least one filter allocated to the first and/or to the second coordinate ascertaining method is reset. In particular, a filter of this type is continuously re-initialized. In this way, in particular incorrect data from states of the filter are removed, preferably preventing the incorrect data from being further processed. In this way, an error propagation, in particular in recursive algorithms, is effectively prevented. As a result, the precision of the method according to the present invention can advantageously be increased.

Preferably, at least one boundary value is specified for a critical first and/or second and/or third deviation, and is monitored for the achieving or exceeding thereof. Alternatively or in addition, preferably at least one boundary value is specified for a discrepancy relating to the satellite signals received by the first and/or the second reference station and/or the at least one first and/or second correction value, and/or for a convergence time allocated to the first and/or to the second coordinate ascertaining method, which boundary value is monitored for the achieving or exceeding thereof. An increased convergence time can in particular be an indicator for a disturbance in the ascertaining of coordinates, resulting for example from constructive changes in the environment surrounding the first and/or the second reference station. Preferably, the monitoring of the at least one boundary value for the achieving or exceeding thereof is carried out continuously. In this way, the method according to the present invention ensures an effective monitoring of the integrity of the reference stations.

In a further preferred specific embodiment of the method, during normal operation the at least one first and/or second correction value is provided to a plurality of user devices of the satellite-supported navigation system in order to correct respectively received satellite signals, in order to ascertain the respective position of each of the devices, and a further item of information concerning the validity of the at least one first and/or second correction value, containing indications concerning the achieving or exceeding of the at least one boundary value, is produced and provided to the plurality of user devices when the at least one boundary value is reached or exceeded. In the satellite-supported navigation system described below, it is provided that the plurality of user devices are each designed as a navigation system in a motor vehicle, a mobile telephone, a tablet computer, a wearable device, a mobile unit, or in some other form. In the method described below for operating a satellite-supported navigation system, the further information is preferably sent to the plurality of user devices via the plurality of satellites of the satellite-supported navigation system, or also via other satellites, or via a mobile radiotelephone network. Here it is preferably provided that, on the basis of the further information, each of the plurality of user devices makes a decision concerning a use of the at least one first and/or second correction value during the ascertaining of its respective position. Alternatively or in addition, it is preferably provided that, during normal operation, the at least one first and/or second correction value is provided to the plurality of user devices of the satellite-supported navigation system in order to correct respectively received satellite signals in order to ascertain the respective position of the device, the provision of the at least one first and/or second correction value being set in at least one selected region for the plurality of user devices upon reaching or exceeding of the at least one boundary value. This region is preferably a geographical region. Preferably, such a region, in which the provision of the at least one first and/or second correction value is set for the plurality of user devices, is selected according to whether an errored ascertaining of the respective position of each of the plurality of user devices is to be expected in this region, in particular due to a discrepancy of the at least one first and/or second correction value. In this way, it is advantageously brought about that, in particular, correction values having discrepancies are not provided to the plurality of user devices, or at least are not provided without a corresponding further item of information. In this way, a high degree of quality of the determination of position by the plurality of user devices can be ensured.

The example method according to the present invention for operating a satellite-supported navigation system may also result in the advantages described above. The satellite-supported navigation system has a plurality of satellites, a plurality of user devices, and a correction service system having reference stations that have known and fixed coordinates in a coordinate system. In the method, at least one first group of the reference stations is operated so as to receive satellite signals from the plurality of satellites of the satellite-supported navigation system. The integrity of the reference stations is monitored by the method according to the present invention for monitoring the integrity of reference stations of a correction service system having known and fixed coordinates.

Preferably, the method according to the present invention for monitoring the integrity of reference stations of a correction service system having known and fixed coordinates is operated using a correction service system of the type described below.

The correction service system according to the present invention may also result in the advantages named above. The correction service system according to the present invention has reference stations in a coordinate system and is designed to carry out the method according to the present invention for monitoring the integrity of reference stations of a correction service system having known and fixed coordinates. For this purpose, control devices programmed in particular to carry out the method according to the present invention are provided that are preferably allocated for the controlling of the reference stations of the correction service system according to the present invention. Preferably, control devices programmed to carry out the method according to the present invention are provided for the controlling of further devices of the correction service system according to the present invention that are required or are advantageous for the method.

Preferably, the method according to the present invention for operating a satellite-supported navigation system is operated using a satellite-controlled navigation system of the type described below.

The satellite-supported navigation system according to the present invention may also result in the advantages named above. The satellite-supported navigation system according to the present invention has a plurality of satellites, a plurality of user devices, and a correction service system of the type described above. For this purpose, control devices programmed in particular to carry out the method according to the present invention are provided that are preferably assigned to the respective device in order to control the plurality of satellites, the plurality of user devices, and the correction service system of the satellite-supported navigation system according to the present invention. Preferably, control devices programmed to carry out the method according to the present invention are provided in order to control additional devices of the satellite-supported navigation system according to the present invention that are required or are advantageous for the method.

In the following, the present invention is explained in more detail on the basis of the figures.

DETAILED DESCRIPTION OF EXAMPLE EMBODIMENTS

Figure 1:
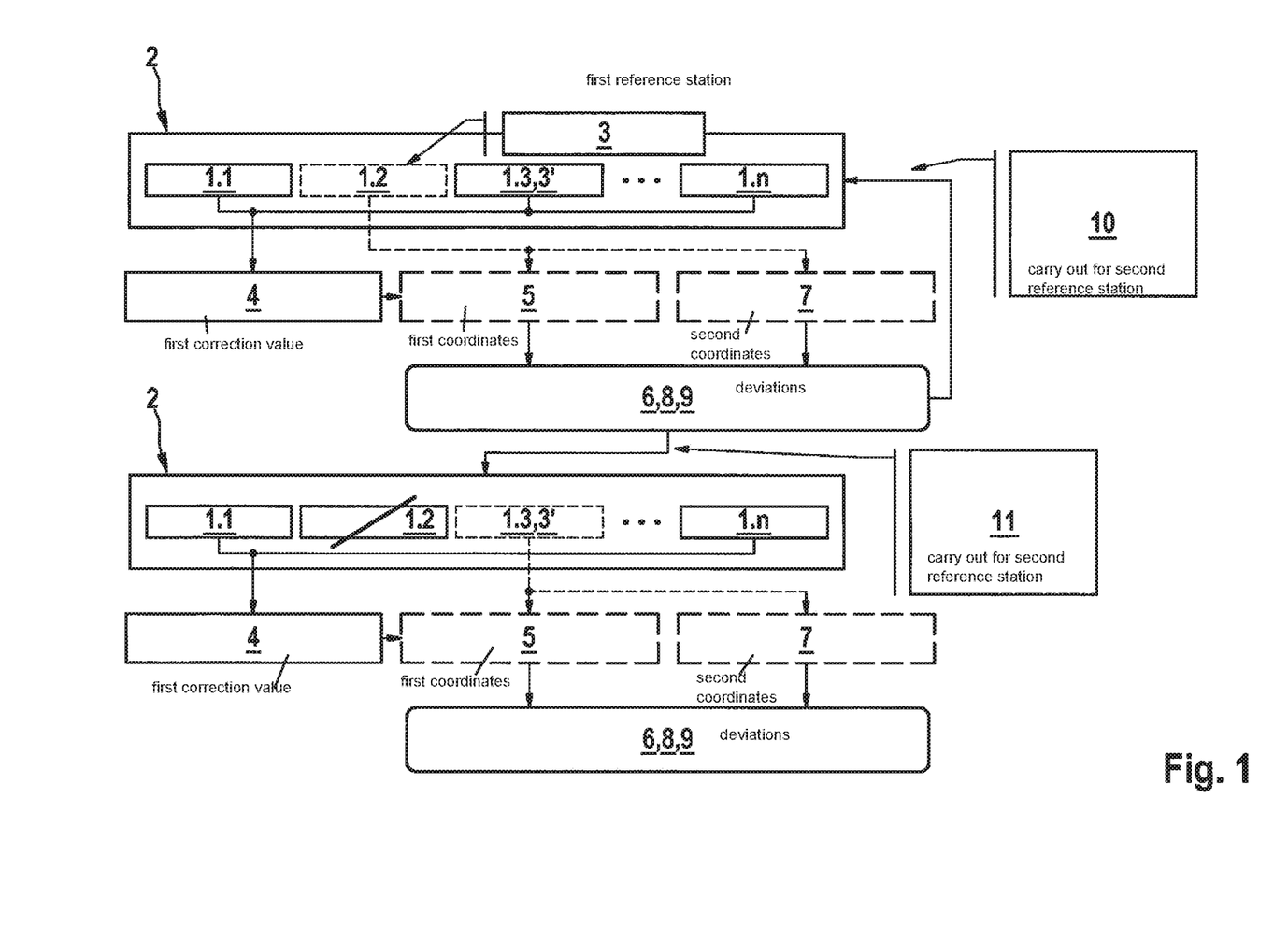
FIG. 1 shows a schematic representation of an exemplary embodiment of an advantageous method for monitoring an integrity of reference stations of a correction service system.

FIG. 1 shows a schematic representation of an exemplary embodiment of an advantageous method for monitoring the integrity of reference stations 1.1, 1.2, 1.3, . . . , 1.$n$, having known and fixed coordinates, of a correction service system for a satellite-supported navigation system in a coordinate system, at least one first group 2 of the reference stations 1.1, 1.2, 1.3, . . . , 1.$n$ being operated so as to receive satellite signals of a plurality of satellites of the satellite-supported navigation system. The advantageous method is distinguished in that, in a step a), a first reference station 3 is selected from first group 2. In the exemplary embodiment of the advantageous method shown here, first reference station 3 corresponds to reference station 1.2. Subsequently, in a step b)—shown in FIG. 1 by reference character 2—at least one first correction value is ascertained as a function of the satellite signals respectively received by the remaining reference stations 1.1, 1.3, . . . , 1.$n$ of the first group 2 and of the known coordinates of the respective remaining reference stations 1.1, 1.3, . . . , 1.$n$ of the first group 2. This step of specifying the correction value is preferably carried out in a data center, or by a server of the correction service system. Subsequently, in a step c) the monitoring of the integrity is carried out by comparing first coordinates of first reference station 1.2, 3, which are determined using the satellite signals received by first reference station 1.2, 3 and using the at least one first correction value—represented by reference character 5—with the known coordinates of first reference station 1.2, 3, and checking for at least one first deviation, which is represented by reference character 6 in FIG. 1.

Preferably, here it is checked whether, given the presence of a first deviation of the type described, a critical mismatch is present in the remaining reference stations 1.1, 1.3, . . . , 1.n of the first group 2 between coordinates ascertained using satellite signals received by the remaining reference stations 1.1, 1.3, . . . , 1.n of the first group 2, and using the at least one first correction value, and the known coordinates of the respective remaining reference stations 1.1, 1.3, . . . , 1.n of first group 2. If no critical mismatch is present in particular in the remaining reference stations 1.1, 1.3, . . . , 1.n of first group 2, then the at least one first correction value can be regarded as correct, and a lack of integrity of first reference station 1.2, 3 can be inferred. If no critical mismatch is present in the remaining reference stations 1.1, 1.3, . . . , 1.n of first group 2, then the at least one first correction value can be regarded as incorrect. In this case, a lack of integrity of first reference station 1.2, 3 cannot be immediately inferred. In particular, a first deviation is not present if the first coordinates of first reference station 1.2, 3 do not deviate, or deviate only slightly, from the known coordinates of first reference station 1.2, 3. This can in particular indicate the correctness of at least one first correction value, and a correct functioning of the remaining reference stations 1.1, 1.3, . . . , 1.n can be deduced. In particular, this can also indicate the integrity of first reference station 1.2, 3.

Preferably, in a step d) second coordinates of first reference station 1.2, 3, determined only using the satellite signals received by first reference station 1.2, 3—represented by reference character 7—are compared with the known coordinates of first reference station 1.2, 3 and are checked for at least one second deviation, as is represented by reference character 8. In particular, if such a second deviation is present, a lack of integrity of first reference station 1.2, 3 can be inferred.

Preferably, a second group (not shown in FIG. 1) of reference stations, different from first group 2, is operated so as to receive satellite signals of the plurality of satellites, at least one second correction value being ascertained in a step e) as a function of the satellite signals respectively received by the reference stations of the second group and the known coordinates of the respective reference station of the second group. Third coordinates of first reference station 1.2, 3, determined using the satellite signals received by first reference station 1.2, 3 and using the at least one second correction value, are then preferably compared with the known coordinates of first reference station 1.2, 3, and are checked for at least one third deviation, as shown in FIG. 1 by reference character 9. Preferably, it is checked whether, given the presence of a third deviation of the type described, a critical mismatch is respectively present in the remaining reference stations 1.1, 1.3, . . . , 1.n of first group 2 between coordinates ascertained using the satellite signals received by the remaining reference stations 1.1, 1.3, . . . , 1.n of first group 2 and the at least one second correction value and the known coordinates of the respective remaining reference stations 1.1, 1.3, . . . , 1.n of first group 2. If no critical mismatch is present in particular in the remaining reference stations 1.1, 1.3, . . . , 1.n of first group 2, then the at least one second correction value can be regarded as correct, and a lack of integrity of first reference station 1.2, 3 can be inferred. If a critical mismatch is present in the remaining reference stations 1.1, 1.3, . . . , 1.n of first group 2, then the at least one second correction value can be regarded as incorrect. In this case, a lack of integrity of first reference station 1.2, 3 cannot be immediately inferred. A third deviation is not present in particular when the third coordinates of first reference station 1.2, 3 do not deviate, or deviate only slightly, from the known coordinates of first reference station 1.2, 3. This can in particular indicate the correctness of at least one second correction value, and a correct functioning of the reference stations of the second group can be deduced. In particular, this can also indicate an integrity of first reference station 1.2, 3.

Preferably, in a step f) second reference station 3', different from first reference station 1.2, 3, is selected from first group 2. In the exemplary embodiment shown here, second reference station 3' is reference station 1.3. If no critical first and/or second and/or third deviation—according to reference characters 6, 8, 9—is ascertained, then preferably steps b) and c), as well as in particular d) and/or e), are carried out for second reference station 1.3, 3', a recursion of this type being shown schematically by reference character 10 in FIG. 1.

Preferably, in a step f') second reference station 1.3, 3' is selected from first group 2, and, given the ascertaining of a critical first and/or second and/or third deviation—6, 8, 9—the steps b) and c), as well as preferably d) and/or e), are carried out for second reference station 1.3, 3' instead of first reference station 1.2, 3, without taking first reference station 1.2, 3 into account; a recursion of this type is shown schematically in FIG. 1 by reference character 11.

In the lower (from the observer's point of view) part of FIG. 1, steps b), c), d), and e) are shown schematically for second reference station 1.3, 3'. First reference station 1.2, 3 is here schematically shown as excluded from first group 2. Otherwise, identical and functionally identical elements are provided with identical reference characters, and to this extent reference is made to the preceding description.

Preferably, discrepancies relating to satellite signals received by first reference station 1.2, 3 and/or second reference station 1.3, 3' and/or the at least one first and/or second correction value are ascertained taking into account an acquired critical first and/or second and/or third deviation.

Preferably, it is provided that steps a) through c), and preferably d) and/or e) and/or f) and/or f'), are carried out for all reference stations 1.1, 1.2, 1.3, 1.n of first group 2.

Preferably, the first and/or the second and/or the third coordinates of first reference station 1.2, 3 and/or of second reference station 1.3, 3' are determined using a first and a second coordinate ascertaining method, the first and the second coordinate ascertaining method being different from one another.

Particularly preferably, the first and the second coordinate ascertaining method are carried out parallel to one another.

Preferably, in the first and/or the second coordinate ascertaining method, after a determination has been carried out of the first coordinates—5—and/or of the second coordinates—7—and/or of the third coordinates—9—of first reference station 1.2, 3 and/or second reference station 1.3, 3', at least one filter allocated to the first and/or to the second coordinate ascertaining method is reset.

It is preferably provided that at least one boundary value is specified for a critical first and/or second and/or third deviation and is monitored for the reaching or exceeding thereof. Alternatively or in addition, at least one boundary value is specified for a discrepancy relating to the satellite signals received by first reference station 1.2, 3 and/or second reference station 1.3, 3', and/or the at least one first and/or second correction value and/or for a convergence time allocated to the first and/or the second coordinate ascertaining method, which boundary value is monitored for the reaching or exceeding thereof.

Preferably, it is provided that, in normal operation, the at least one first and/or second correction value is provided to a plurality of user devices of the satellite-supported navigation system for correcting respectively received satellite signals, in order to ascertain the respective position of the device, and, if the at least one boundary value is reached or exceeded, a further item of information concerning the validity of the at least one first and/or second correction value, containing indications concerning the reaching or exceeding of the at least one boundary value, is produced and provided to the plurality of user devices. Alternatively or in addition, preferably the provision of the at least one first and/or second correction value for the plurality of user devices is set at least in a selected region. The at least one first and/or second correction value is preferably made globally valid. Alternatively, the at least one first and/or second correction value is preferably realized as at least one modeling parameter as a function of which the respective position of each of the plurality of user devices can be ascertained.

In the context of a method for operating a satellite-supported navigation system having a plurality of satellites, a plurality of user devices, and a correction service system, the correction service system having reference stations 1.1, 1.2, 1.3, 1.n that have known and fixed coordinates in a coordinate system, and at least one first group 2 of the reference stations 1.1, 1.2, 1.3, 1.n being operated so as to receive satellite signals from the plurality of satellites of the satellite-supported navigation system, an integrity of reference stations 1.1, 1.2, 1.3, 1.n is monitored using a method of the type described above on the basis of FIG. 1.

Figure 2:
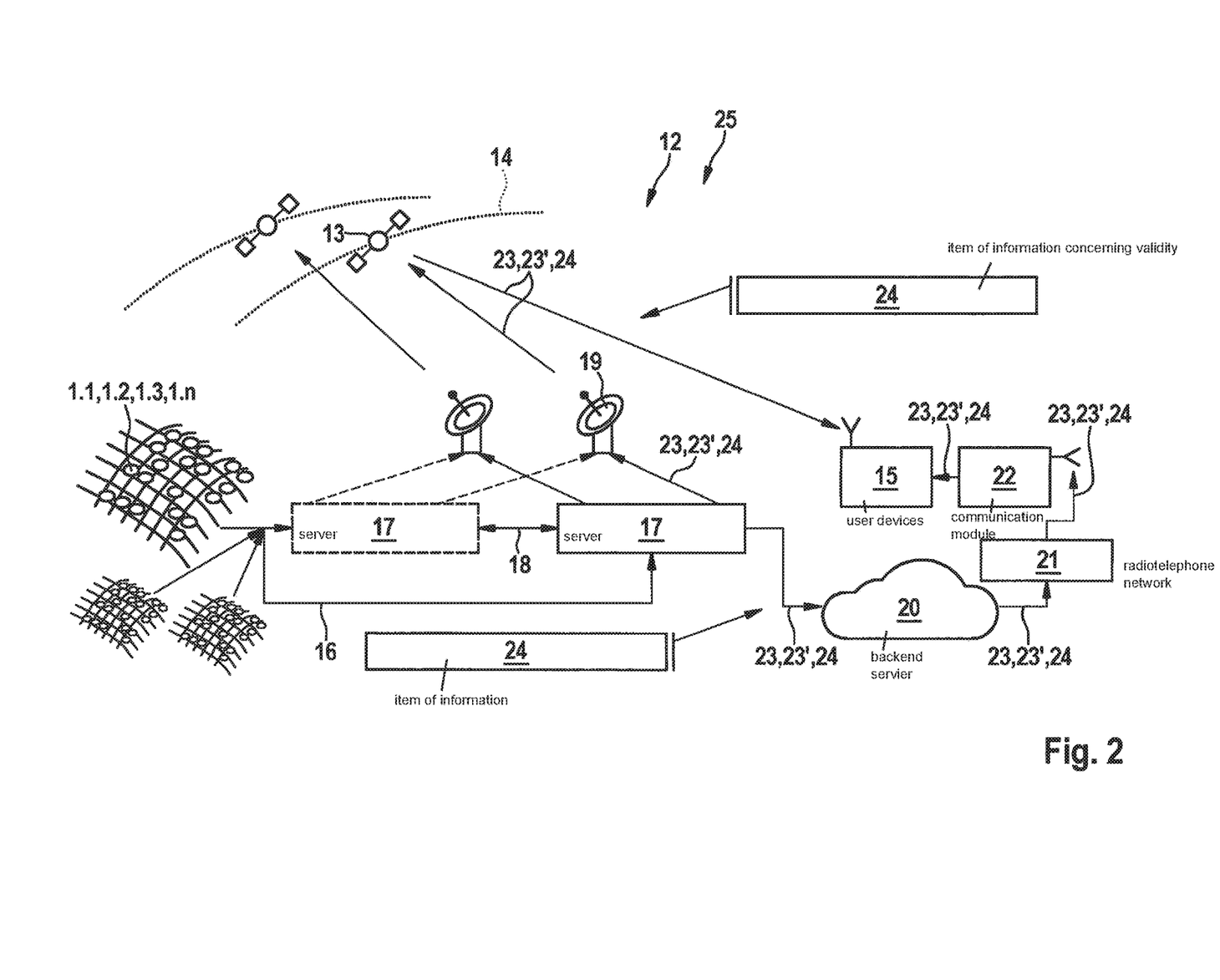
FIG. 2 shows a schematic representation of an exemplary embodiment of an advantageous correction service system.

FIG. 2 shows a schematic representation of an exemplary embodiment of an advantageous correction service system 12. Identical and functionally identical elements are provided with identical reference characters, so that to this extent reference is made to the preceding description. Correction service system 12 has reference stations 1.1, 1.2, 1.3, 1.n, having known and fixed coordinates, in a coordinate system, and is designed to carry out the above-described method for monitoring the integrity of reference stations of a correction service system 12 having known and fixed coordinates, or is operated using the method described above.

In the exemplary embodiment shown in FIG. 2, correction service system 12 is situated in a coordinate system. Correction service system 12 has at least one—here, two—communication satellites 13 here. Each of the communication satellites 13 moves along a satellite path 14. It is preferably provided that each communication satellite 13 is assigned to a geographical region, in particular a continent.

In addition, correction service system 12 has the plurality of reference stations 1.1, 1.2, 1.3, 1.n, having known and fixed coordinates, preferably in a global network, only one such reference station being provided with a reference character for clarity. The advantageous correction service system 12 is preferably set up to monitor an integrity of reference stations 1.1, 1.2, 1.3, 1.n in the coordinate system.

Correction service system 12 is part of a satellite-supported navigation system 25 that, in addition to correction service system 12, also has a plurality (not shown in FIG. 2) of satellites and a plurality of user devices 15. In FIG. 2, for clarity only one user device 15 is shown. In the exemplary embodiment shown in FIG. 2, using reference stations 1.1, 1.2, 1.3, 1.n, data packets 16 having information for ascertaining correction values, for example satellite signals, processed satellite signals, or other information, are preferably provided to a data center or to a server 17—here, two data centers or servers 17—of correction service system 12. Preferably, the data centers or servers 17 are calibrated to one another, the data packets 16 and/or the at least one first and/or second correction value being checked for consistency, as shown by arrow 18.

The data centers or servers 17 are each communicatively connected to transmit stations 19—here, each to two transmit stations 19—of correction service system 12. Via transmit stations 19, preferably in each case a communication connection is realized between the data centers or servers 17 and the communication satellites 13. The plurality of user devices 15 are preferably each capable of being communicatively connected to the communication satellites 13, and particularly preferably are so communicatively connected. Due to the redundant availability of the data centers or servers 17 and/or the transmit stations 19, when there is a failure of a data center or server 17 or of a transmit station 19, reliable operation of correction service system 12 is ensured.

Optionally, the data centers or servers 17 preferably additionally (as shown in FIG. 2), or also alternatively, each have a communicative connection to a backend server 20 of correction service system 12. Backend server 20 is then preferably communicatively connected to a mobile radiotelephone network 21 of correction service system 12. Here, mobile radiotelephone network 21 is in particular wirelessly communicatively connected to a communication module 22 of satellite-supported navigation system 25, which preferably is allocated to one of the plurality of user devices 15. In this exemplary embodiment, each communication module 22 stands in communicative connection with one of the plurality of user devices 15.

The advantageous satellite-supported navigation system 25 has the plurality (not shown here) of satellites that, in a further preferred exemplary embodiment (not shown here) are also realized as communication satellites 13. Preferably, the plurality of satellites are set up to send the satellite signals (not shown here) at least to the first group 2 of reference stations 1.1, 1.2, 1.3, 1.n. At least one first group 2 of reference stations 1.1, 1.2, 1.3, 1.n is operated so as to receive the satellite signals of the plurality of satellites of satellite-supported navigation system 25. In connection with the advantageous correction service system 12, it is provided that the first reference station 3 can be selected from first group 2 of reference stations 1.1, 1.2, 1.3, 1.n, the first reference station 3 being reference station 1.2 in the exemplary embodiment shown in FIG. 1. The at least one first correction value 23 is ascertained as a function of the satellite signals respectively received by the remaining reference stations 1.1, 1.3, . . . , 1.n of first group 2, and of the known coordinates of the respective remaining reference station 1.1, 1.3, . . . , 1.n of first group 2. In addition, in order to monitor the integrity the first coordinates of first reference station 1.2, 3, which can be determined using the satellite signals received by first reference station 1.2, 3 and the at least one first correction value 23, can be compared with the known coordinates of first reference station 1.2, 3 and checked for the at least one first deviation.

In a further exemplary embodiment of the advantageous correction service system 12, it is provided that, in normal operation, the at least one first correction value 23 and/or second correction value 23' is provided to the plurality of user devices 15 of satellite-supported navigation system 25 in order to correct respectively received satellite signals in order to ascertain the respective position of the device, and upon reaching or exceeding of the at least one boundary value, a further item of information 24 concerning the validity of the at least one first and/or second correction value 23, 23', containing indications about the reaching or exceeding of the at least one boundary value, is produced and provided to the plurality of user devices 15. Alternatively or in addition, preferably the provision of the at least one first and/or second correction value 23, 23' for the plurality of user devices 15 is set at least in a selected region.

In the exemplary embodiment shown in FIG. 2 of correction service system 12, the at least one first and/or second correction value 23, 23' is preferably ascertained using the data centers or servers 17 as a function of the data packets 16 provided by reference stations 1.1, 1.2, 1.3, 1.n. The at least one first and/or second correction value 23, 23' is provided to the plurality of user devices 15 via transmit stations 19 and communication satellites 13, and in particular is sent to the plurality of user devices 15. In this exemplary embodiment, the at least one first and/or second correction value 23, 23' is preferably provided, in particular sent, in parallel to the plurality of user devices 15 via backend server 20, mobile radiotelephone network 21, and the communication module 22 respectively assigned to the plurality of user devices 15. Preferably, the plurality of user devices 15 receives the at least one first and/or second correction value 23, 23' either from communication satellites 13 or via mobile radiotelephone network 21, so that a reliable supplying of the at least one first and/or second correction value 23, 23' to the plurality of user devices 15 is ensured.

In the exemplary embodiment shown in FIG. 2, the further item of information 24 is preferably provided to the plurality of user devices 15 together with the at least one first and/or second correction value 23, 23'. The further item of information 24 is preferably produced by the data centers or servers 17.

Preferably, the further item of information 24 is provided to the plurality of user devices 15, in particular is sent to the plurality of user devices 15, via transmit stations 19 and communication satellites 13. Alternatively or in addition, preferably the further item of information 24 is provided to the plurality of user devices 15, in particular is sent to the plurality of user devices 15, via backend server 20, mobile radiotelephone network 21, and communication module 22. Preferably, the further item of information 24 is provided, particularly preferably sent, to the plurality of user devices 15 in a common data stream with the at least one first and/or second correction value 23, 23'.

In another preferred exemplary embodiment, the further item of information 24 is produced in some other way, in particular not by the data centers or servers 17. The further item of information 24 is preferably provided to the plurality of user devices 15 separately from the at least one first and/or second correction value 23, 23'.

In particular, it can be seen that, using the method according to the present invention and the correction service system 12 according to the present invention, the integrity of reference stations 1.1, 1.2, 1.3, 1.n can be monitored, and reference stations 1.1, 1.2, 1.3, 1.n having a lack of integrity can be quickly and reliably excluded from the first group 2 of reference stations 1.1, 1.2, 1.3, 1.n. In this way, a high degree of precision and reliability of the ascertaining of the position of user devices 15 in the satellite-supported navigation system 25 is ensured.

What is claimed is:

1. A method for monitoring an integrity of reference stations, having known and fixed coordinates, of a correction service system for a satellite-supported navigation system in a coordinate system, the method comprising:
   a) operating at least one first group of the reference stations to receive satellite signals of a plurality of satellites of the satellite-supported navigation system;
   b) selecting a first reference station from the first group;
   c) ascertaining at least one first correction value as a function of the satellite signals respectively received by remaining ones of the reference stations of the first group and the known coordinates of the respective remaining reference station of the first group;
   d) monitoring the integrity by: determining first coordinates of the first reference station using the satellite signals received by the first reference station and the at least one first correction value, comparing the determined first coordinates with the known coordinates of the first reference station, and checking, based on the comparing, for at least one first deviation, wherein:
   each one of a number of the remaining reference stations, the at least one first correction value, and the at least one first deviation is a respective non-zero number; and
   e) determining second coordinates of the first reference station only using the satellite signals received by the first reference station, comparing the second coordinates with the known coordinates of the first reference station, and, checking, based on the comparing of the second coordinates with the known coordinates of the first reference stations, for at least one second deviation.

2. The method as recited in claim 1, further comprising:
operating a second group of reference stations, different from the first group, so as to receive satellite signals from the plurality of satellites;
ascertaining at least one second correction value as a function of the satellite signals received by the reference stations of the second group and the known coordinates of the respective reference station of the second group; and
determining third coordinates of the first reference station, using the satellite signals received by the first reference station and the at least one second correction value, comparing the determined third coordinates with the known coordinates of the first reference station, and checking, based on the comparing of the third coordinates with the known coordinates of the first reference station, for at least one third deviation.

3. A method for monitoring an integrity of reference stations, having known and fixed coordinates, of a correction service system for a satellite-supported navigation system in a coordinate system, the method comprising:
   a) operating at least one first group of the reference stations to receive satellite signals of a plurality of satellites of the satellite-supported navigation system;
   b) selecting a first reference station from the first group;
   c) ascertaining at least one first correction value as a function of the satellite signals respectively received by remaining ones of the reference stations of the first group and the known coordinates of the respective remaining reference station of the first group;
   d) monitoring the integrity by: determining first coordinates of the first reference station using the satellite signals received by the first reference station and the at least one first correction value, comparing the determined first coordinates with the known coordinates of the first reference station, and checking, based on the comparing, for at least one first deviation, wherein:
   each one of a number of the remaining reference stations, the at least one first correction value, and the at least one first deviation is a respective non-zero number; and e) selecting a second reference station, which is different from the first reference station, from the first group, and, if no critical first deviation is ascertained, carrying out steps c) and d) for the second reference station.

4. A method for monitoring an integrity of reference stations, having known and fixed coordinates, of a correction service system for a satellite-supported navigation system in a coordinate system, the method comprising:
   a) operating at least one first group of the reference stations to receive satellite signals of a plurality of satellites of the satellite-supported navigation system;
   b) selecting a first reference station from the first group;
   c) ascertaining at least one first correction value as a function of the satellite signals respectively received by remaining ones of the reference stations of the first group and the known coordinates of the respective remaining reference station of the first group;
   d) monitoring the integrity by: determining first coordinates of the first reference station using the satellite signals received by the first reference station and the at least one first correction value, comparing the determined first coordinates with the known coordinates of the first reference station, and checking, based on the comparing, for at least one first deviation, wherein:
   each one of a number of the remaining reference stations, the at least one first correction value, and the at least one first deviation is a respective non-zero number; and
   e) selecting a second reference station, which is different from the first reference station, from the first group, and, upon ascertaining of a critical first deviation, carrying out steps c) and d) for the second reference station instead of the first reference station, without taking into account the first reference station.

5. A method for monitoring an integrity of reference stations, having known and fixed coordinates, of a correction service system for a satellite-supported navigation system in a coordinate system, the method comprising:
   a) operating at least one first group of the reference stations to receive satellite signals of a plurality of satellites of the satellite-supported navigation system;
   b) selecting a first reference station from the first group;
   c) ascertaining at least one first correction value as a function of the satellite signals respectively received by remaining ones of the reference stations of the first group and the known coordinates of the respective remaining reference station of the first group;
   d) monitoring the integrity by: determining first coordinates of the first reference station using the satellite signals received by the first reference station and the at least one first correction value, comparing the determined first coordinates with the known coordinates of the first reference station, and checking, based on the comparing, for at least one first deviation, wherein:
   each one of a number of the remaining reference stations, the at least one first correction value, and the at least one first deviation is a respective non-zero number; and
   e) ascertaining, taking into account an acquired critical first deviation, discrepancies relating to satellite signals received by the first reference station and/or the at least one first correction value.

6. A method for monitoring an integrity of reference stations, having known and fixed coordinates, of a correction service system for a satellite-supported navigation system in a coordinate system, the method comprising:
   a) operating at least one first group of the reference stations to receive satellite signals of a plurality of satellites of the satellite-supported navigation system;
   b) selecting a first reference station from the first group;
   c) ascertaining at least one first correction value as a function of the satellite signals respectively received by remaining ones of the reference stations of the first group and the known coordinates of the respective remaining reference station of the first group;
   d) monitoring the integrity by: determining first coordinates of the first reference station using the satellite signals received by the first reference station and the at least one first correction value, comparing the determined first coordinates with the known coordinates of the first reference station, and checking, based on the comparing, for at least one first deviation, wherein:
   each one of a number of the remaining reference stations, the at least one first correction value, and the at least one first deviation is a respective non-zero number; and
   wherein steps b) through d) are carried out for all reference stations of the first group.

7. A method for monitoring an integrity of reference stations, having known and fixed coordinates, of a correction service system for a satellite-supported navigation system in a coordinate system, the method comprising:
   a) operating at least one first group of the reference stations to receive satellite signals of a plurality of satellites of the satellite-supported navigation system;
   b) selecting a first reference station from the first group;
   c) ascertaining at least one first correction value as a function of the satellite signals respectively received by remaining ones of the reference stations of the first group and the known coordinates of the respective remaining reference station of the first group;
   d) monitoring the integrity by: determining first coordinates of the first reference station using the satellite signals received by the first reference station and the at least one first correction value, comparing the determined first coordinates with the known coordinates of the first reference station, and checking, based on the comparing, for at least one first deviation, wherein:
   each one of a number of the remaining reference stations, the at least one first correction value, and the at least one first deviation is a respective non-zero number; and
   wherein the first coordinates of the first reference station are determined using a first and a second coordinate ascertaining method, the first and the second coordinate ascertaining method being different from one another.

8. The method as recited in claim 7, wherein the first and the second coordinate ascertaining method are carried out in parallel with one another.

9. The method as recited in claim 7, wherein in the first and/or the second coordinate ascertaining method, after a determination has been carried out of the first coordinates of the first reference station), at least one filter allocated to the first and/or to the second coordinate ascertaining method is reset.

10. The method as recited in claim 7, wherein at least one boundary value is specified: (i) for a critical first deviation, and/or (ii) for a discrepancy relating to satellite signals received by the first reference station, and/or the at least one first correction value, and/or (ii) for a convergence time allocated to the first and/or to the second coordinate ascertaining method, which boundary value is monitored for the reaching or exceeding thereof.

11. The method as recited in claim 10, wherein in normal operation, the at least one first correction value is provided to a plurality of user devices of the satellite-supported navigation system for the correction of respectively received satellite signals in order to ascertain the respective position of the device, and, upon the reaching or exceeding of the at least one boundary value, a further item of information concerning validity of the at least one first correction value), containing indications about the reaching or exceeding of the at least one boundary value, is produced and is provided to the plurality of user devices, and/or the provision of the at least one first correction value for the plurality of user devices is set at least in a selected region.

12. A method for operating a satellite-supported navigation system having a plurality of satellites, a plurality of user devices, and a correction service system, the correction service system having reference stations that have known and fixed coordinates in a coordinate system, and at least one first group of the reference stations being operated so as to receive satellite signals of the plurality of satellites of the satellite-supported navigation system, the method comprising:

monitoring an integrity of the reference stations by:
a) selecting a first reference station from the first group;
b) ascertaining at least one first correction value as a function of the satellite signals respectively received by the remaining reference stations of the first group and the known coordinates of the respective remaining reference station of the first group;
c) monitoring the integrity by: determining first coordinates of the first reference station using the satellite signals received by the first reference station and the at least one first correction value, comparing the determined first coordinates with the known coordinates of the first reference station, and checking, based on the comparing, for at least one first deviation, wherein:
each one of a number of the remaining reference stations, the at least one first correction value, and the at least one first deviation is a respective non-zero number; and
d) determining second coordinates of the first reference station only using the satellite signals received by the first reference station, comparing the second coordinates with the known coordinates of the first reference station, and, checking, based on the comparing of the second coordinates with the known coordinates of the first reference stations, for at least one second deviation.

13. A correction service system having reference stations that have known and fixed coordinates in a coordinate system, at least one first group of the reference stations being operated to receive satellite signals of a plurality of satellites of the satellite-supported navigation system, the correction service system configured to monitor an integrity of the reference stations, and configured to:
a) select a first reference station from the first group;
b) ascertain at least one first correction value as a function of the satellite signals respectively received by the remaining reference stations of the first group and the known coordinates of the respective remaining reference station of the first group;
c) monitor the integrity by: determining first coordinates of the first reference station using the satellite signals received by the first reference station and the at least one first correction value, compare the determined first coordinates with the known coordinates of the first reference station, and check, based on the comparing, for at least one first deviation, wherein:
each one of a number of the remaining reference stations, the at least one first correction value, and the at least one first deviation is a respective non-zero number; and
d) determine second coordinates of the first reference station only using the satellite signals received by the first reference station, compare the second coordinates with the known coordinates of the first reference station, and, check, based on the comparing of the second coordinates with the known coordinates of the first reference stations, for at least one second deviation.

14. A satellite-supported navigation system, comprising:
a plurality of satellites;
a plurality of user devices; and
a correction service system having reference stations that have known and fixed coordinates in a coordinate system, at least one first group of the reference stations being operated to receive satellite signals of the plurality of satellites of the satellite-supported navigation system, the correction service system configured to monitor an integrity of the reference stations, and configured to:
a) select a first reference station from the first group;
b) ascertain at least one first correction value as a function of the satellite signals respectively received by the remaining reference stations of the first group and the known coordinates of the respective remaining reference station of the first group;
c) monitor the integrity by: determining first coordinates of the first reference station using the satellite signals received by the first reference station and the at least one first correction value, compare the determined first coordinates with the known coordinates of the first reference station, and check, based on the comparing, for at least one first deviation, wherein:
each one of a number of the remaining reference stations, the at least one first correction, and
d) determine second coordinates of the first reference station only using the satellite signals received by the first reference station, compare the second coordinates with the known coordinates of the first reference station, and, check, based on the comparing of the second coordinates with the known coordinates of the first reference stations, for at least one second deviation.

\* \* \* \* \*